United States Patent
Emoto

(10) Patent No.: US 12,202,471 B2
(45) Date of Patent: Jan. 21, 2025

(54) VEHICLE CONTROL METHOD AND VEHICLE CONTROL DEVICE

(71) Applicant: Nissan Motor Co., Ltd., Yokohama (JP)

(72) Inventor: Shuhei Emoto, Kanagawa (JP)

(73) Assignee: Nissan Motor Co., Ltd., Yokohama (JP)

( * ) Notice: Subject to any disclaimer, the term of this patent is extended or adjusted under 35 U.S.C. 154(b) by 0 days.

(21) Appl. No.: 18/683,668

(22) PCT Filed: Aug. 30, 2021

(86) PCT No.: PCT/JP2021/031772
§ 371 (c)(1),
(2) Date: Feb. 14, 2024

(87) PCT Pub. No.: WO2023/032009
PCT Pub. Date: Mar. 9, 2023

(65) Prior Publication Data
US 2024/0425039 A1    Dec. 26, 2024

(51) Int. Cl.
*B60W 30/09*    (2012.01)
*G08G 1/16*    (2006.01)

(52) U.S. Cl.
CPC ......... *B60W 30/09* (2013.01); *B60W 2520/06* (2013.01); *B60W 2520/10* (2013.01);
(Continued)

(58) Field of Classification Search
CPC ............ B60W 30/09; B60W 2520/06; B60W 2520/10; B60W 2520/105; B60W 2554/802; B60W 2720/10; G08G 1/16
See application file for complete search history.

(56) References Cited

U.S. PATENT DOCUMENTS 9,862,382 B2    1/2018    Nakamura et al.
10,864,939 B2    12/2020    Hirate et al.
(Continued)

FOREIGN PATENT DOCUMENTS

JP    2018-177153 A    11/2018
JP    2020-111090 A    7/2020
(Continued)

*Primary Examiner* — Tarek Elarabi
(74) *Attorney, Agent, or Firm* — Young Basile Hanlon & MacFarlane, P.C.

(57) ABSTRACT

A vehicle control method causes a controller to execute: vehicle speed determination processing of determining whether or not vehicle speed of an own vehicle is reduced to less than a predetermined speed threshold; lateral deviation detection processing of detecting lateral deviation of the own vehicle with respect to a lane center or a lane boundary line; target trajectory generation processing of, when determining that the vehicle speed is reduced to less than the speed threshold, generating a first target travel trajectory of the own vehicle in such a way as to suppress change in the lateral deviation at and after a vehicle speed reduction time point; avoidance target detection processing of detecting an avoidance target; and avoidance processing of avoiding the avoidance target by, after the vehicle speed reduction time point, adjusting deceleration of the own vehicle while the own vehicle travels along the first target travel trajectory.

7 Claims, 6 Drawing Sheets

(52) U.S. Cl.
CPC . *B60W 2520/105* (2013.01); *B60W 2554/802* (2020.02); *B60W 2720/10* (2013.01); *G08G 1/16* (2013.01)

(56) References Cited

U.S. PATENT DOCUMENTS

| | | | |
|---|---|---|---|
| 2008/0086269 A1* | 4/2008 | Joe | B60W 30/09 |
| | | | 701/301 |
| 2014/0052355 A1* | 2/2014 | Heinrichs-Bartscher | |
| | | | B60W 30/0953 |
| | | | 701/70 |
| 2017/0291603 A1 | 10/2017 | Nakamura | |
| 2018/0304921 A1* | 10/2018 | Hirate | B62D 15/025 |
| 2020/0216096 A1* | 7/2020 | Ishioka | B60W 50/14 |
| 2021/0291818 A1* | 9/2021 | Barth | B60W 30/04 |

FOREIGN PATENT DOCUMENTS

| | | |
|---|---|---|
| JP | 2021-011168 A | 2/2021 |
| WO | 2013/136781 A1 | 9/2013 |
| WO | 2016/024315 A1 | 2/2016 |

* cited by examiner

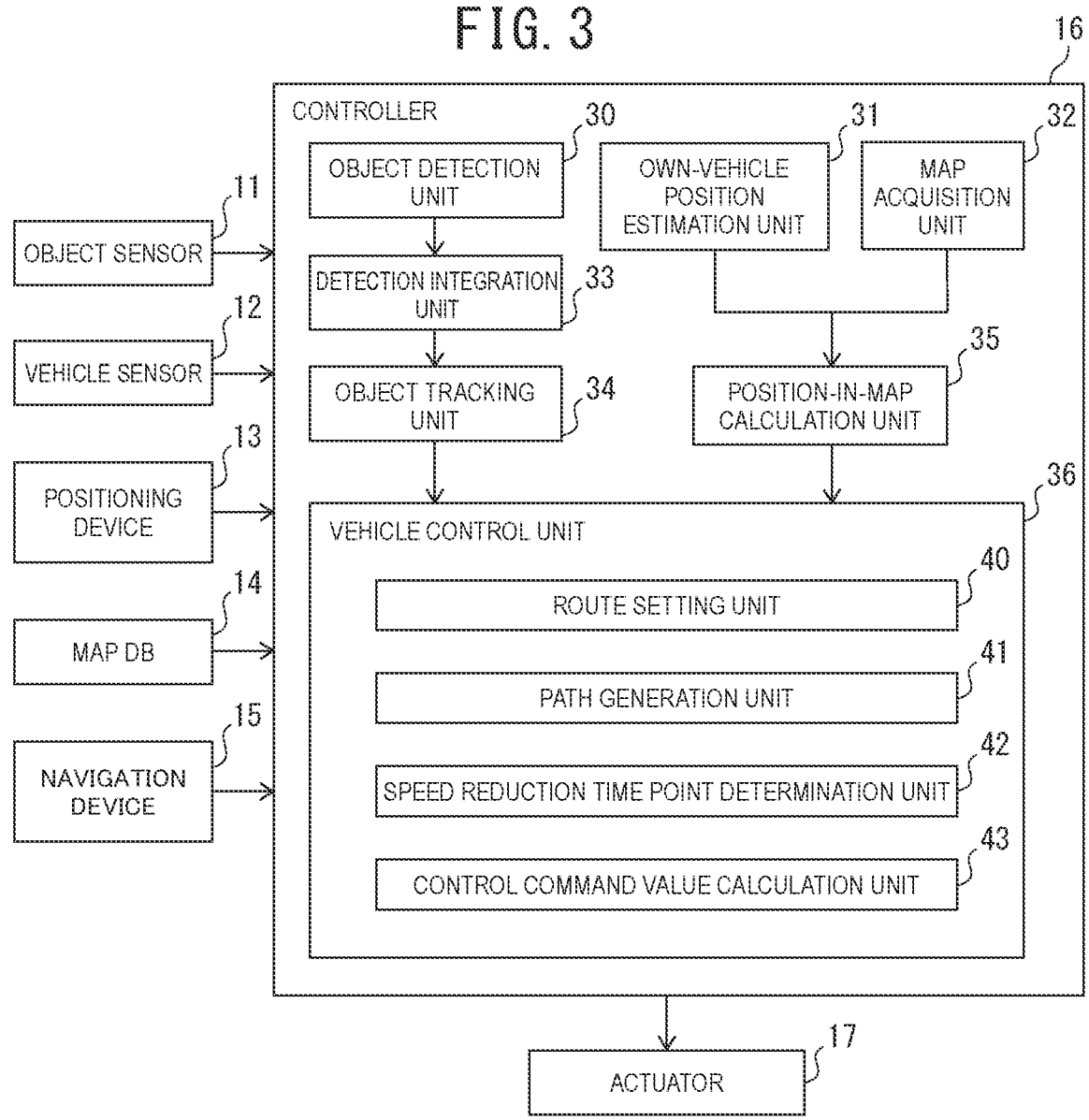

VEHICLE CONTROL METHOD AND VEHICLE CONTROL DEVICE

TECHNICAL FIELD

The present invention relates to a vehicle control method and a vehicle control device.

BACKGROUND

In, for example, WO 2016/024315 A1 described below, a travel control device that causes an own vehicle to travel avoiding an object around the own vehicle is described.

SUMMARY

However, there are some cases where when a large turning angle change is generated when an object is autonomously avoided, the steering wheel largely moves and a passenger is given a sense of discomfort.

An object of the present invention is to suppress an excessive turning angle change generated when an object is autonomously avoided.

According to an aspect of the present invention, there is provided a vehicle control method causing a controller to execute: vehicle speed determination processing of determining whether or not vehicle speed of an own vehicle is reduced to less than a predetermined speed threshold; lateral deviation detection processing of detecting lateral deviation of the own vehicle with respect to a lane center or a lane boundary line; target trajectory generation processing of, when determining that the vehicle speed is reduced to less than the speed threshold, generating a first target travel trajectory of the own vehicle in such a way as to suppress change in the lateral deviation at and after a vehicle speed reduction time point, the vehicle speed reduction time point being a time point at which the vehicle speed is reduced to less than the speed threshold; avoidance target detection processing of detecting an avoidance target to be avoided by the own vehicle; and avoidance processing of avoiding the avoidance target by, after the vehicle speed reduction time point, adjusting deceleration of the own vehicle while the own vehicle travels along the first target travel trajectory.

According to an aspect of the present invention, it is possible to suppress an excessive turning angle change generated when an object is autonomously avoided.

BRIEF DESCRIPTION OF THE DRAWINGS

FIG. 3 is a block diagram of an example of a functional configuration of a controller in FIG. 1;

DETAILED DESCRIPTION (Configuration)

Figure 1:
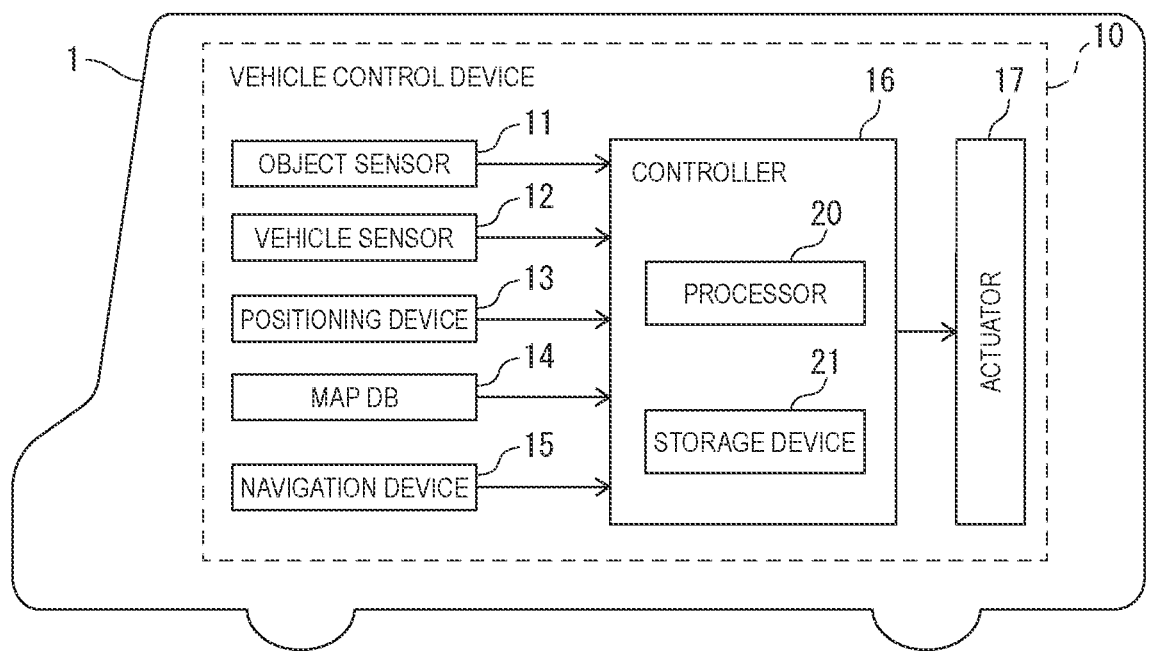
FIG. 1 is a diagram illustrative of an example of a schematic configuration of a vehicle control device of an embodiment.

FIG. 1 is a diagram illustrative of an example of a schematic configuration of a vehicle on which a vehicle control device of an embodiment is mounted. An own vehicle 1 includes a vehicle control device 10 configured to control travel of the own vehicle 1. The vehicle control device 10 detects a travel environment around the own vehicle 1 by sensors and assists travel of the own vehicle 1, based on the travel environment around the own vehicle 1. Travel assistance control of the own vehicle 1 performed by the vehicle control device 10 may include, for example, autonomous travel control causing the own vehicle 1 to autonomously travel without involvement of a driver. In addition, the travel assistance control by the vehicle control device 10 may include driving assistance control to assist a driver of the own vehicle 1 by partially controlling a steering angle, driving force, or braking force of the own vehicle 1.

The vehicle control device 10 includes object sensors 11, vehicle sensors 12, a positioning device 13, a map database (map DB) 14, a navigation device 15, a controller 16, and actuators 17.

The object sensors 11 include a plurality of object detection sensors of different types, such as a laser radar, a millimeter-wave radar, a sonar, a camera, and a LIDAR that are mounted on the own vehicle 1, that are configured to detect objects around the own vehicle 1.

The vehicle sensors 12 detect various information (vehicle signals) that can be acquired from the own vehicle 1. The vehicle sensors 12 include, for example, a vehicle speed sensor, wheel speed sensors, a triaxial acceleration sensor, a steering angle sensor to detect a steering angle, a gyro sensor to detect angular velocity generated in the own vehicle 1, a yaw rate sensor to detect a yaw rate, an accelerator sensor to detect accelerator opening of the own vehicle, and a brake sensor to detect a brake operation amount by the driver.

The positioning device 13 includes a global navigation satellite system receiver and, by receiving radio waves from a plurality of navigation satellites, measures a current position of the own vehicle 1. The global navigation satellite system receiver may be, for example, a global positioning system receiver or the like. The positioning device 13 may be, for example, an inertial navigation device.

The map database 14 may store high-definition map data (hereinafter, simply referred to as "high-definition map") that are suitable as a map for self-driving. The high-definition map is map data of higher definition than map data for navigation (hereinafter, simply referred to as "navigation map") and includes lane-by-lane information, which is more detailed than road-by-road information. For example, the lane-by-lane information includes information of lane nodes that indicate reference points on a lane reference line (for example, a lane center line) and information of lane links that indicate forms of lane sections between lane nodes. Information of each lane node includes an identification number and position coordinates of the lane node, the number of connected lane links, and identification numbers of connected lane links. Information of each lane link includes an identification number of the lane link, a type of the lane, width of the lane, types of lane boundary lines, a shape of the lane, a shape of a lane marking, and a shape of a lane reference line.

The navigation device 15 recognizes a current position of the own vehicle, using the positioning device 13 and acquires map information at the current position from the map database 14. The navigation device 15 sets a road-based route (hereinafter, sometimes referred to as "navigation route") to a destination that a passenger inputs and performs route guidance for the passenger in accordance with the navigation route. The navigation device 15 also outputs information about the navigation route to the controller 16. When performing autonomous travel control, the controller 16 may autonomously drive the own vehicle in such a way that the own vehicle travels along the navigation route.

The controller 16 is an electronic control unit (ECU) that controls travel of the own vehicle 1. The controller 16 includes a processor 20 and peripheral components, such as a storage device 21. The processor 20 may be, for example, a CPU or an MPU. The storage device 21 may include a semiconductor storage device, a magnetic storage device, an optical storage device, and the like. The storage device 21 may include registers, a cache memory, and a memory, such as a ROM and a RAM, that is used as a main storage device. Functions of the controller 16, which will be described below, may be achieved by, for example, the processor 20 executing computer programs stored in the storage device 21. The controller 16 may be formed by dedicated hardware (for example, a programmable logic device, such as an FPGA) for executing respective types of information processing that will be described below.

The actuators 17 operate a steering wheel, accelerator opening, and a braking device of the own vehicle 1 in accordance with control signals output from the controller 16 and thereby generate vehicle behavior of the own vehicle 1. The actuators 17 include a steering actuator configured to control a steering angle of steering of the own vehicle 1, an accelerator opening actuator configured to control accelerator opening of the own vehicle 1, and a brake control actuator configured to control braking action of the braking device.

Figure 2A:
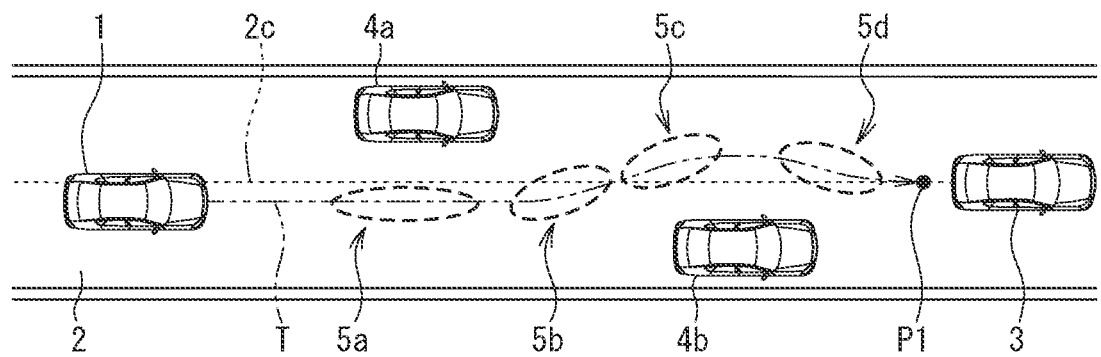
FIG. 2A is an explanatory diagram of a problem in conventional vehicle control.

Next, an example of control of the own vehicle 1 performed by the controller 16 will be described. FIG. 2A is an explanatory diagram of a problem in conventional vehicle control.

Control to set a target travel trajectory of the own vehicle 1 along a lane center 2c of a lane 2 and cause the own vehicle 1 to travel along the target travel trajectory and to stop at a target stop position P1 is now assumed. The target stop position P1 may be a position a predetermined distance short of, for example, a preceding vehicle 3 or a not-illustrated stop line. At positions in front of the own vehicle 1 on the lane 2, parked vehicles 4a and 4b exist as avoidance targets to be avoided by the own vehicle 1. Thus, the controller 16 causes the own vehicle 1 to travel in such a way as to, while keeping distances to the parked vehicles 4a and 4b, come close to the target travel trajectory extending along the lane center 2c. For example, the own vehicle 1 travels along a trajectory T.

In the example of the trajectory T, in order to keep a distance to the parked vehicle 4a, the own vehicle 1 travels while having a deviation in the lane width direction (hereinafter, sometimes referred to as "lateral deviation") from the lane center 2c (that is, the target travel trajectory), as illustrated by an arrow 5a. After having passed the parked vehicle 4a, the own vehicle 1 steers to the left-hand side in such a manner as to eliminate the lateral deviation, as illustrated by an arrow 5b. In addition, in order to keep a distance to the parked vehicle 4b immediately before the target stop position P1, the own vehicle 1 steers to the left-hand side and generates a lateral deviation from the target travel trajectory, as illustrated by an arrow 5c. After having passed the parked vehicle 4b, the own vehicle 1 steers to the right-hand side in such a manner as to eliminate the lateral deviation, as illustrated by an arrow 5d.

When after passing the parked vehicle 4b, the own vehicle 1 steers in such a manner as to eliminate the lateral deviation as described above, steering angle change sometimes becomes large. For example, when the own vehicle 1 is caused to stop at the target stop position P1, vehicle speed of the own vehicle 1 becomes an extremely low speed (for example, less than 2.0 m/s). At such an extremely low speed, the steering angle change required to eliminate the lateral deviation sometimes becomes large. This is because at an extremely low speed at which lateral speed is low, a radius of curvature of turning becomes small. As a result, there are some cases where the steering wheel largely moves and a passenger is given a sense of discomfort.

Figure 2B:
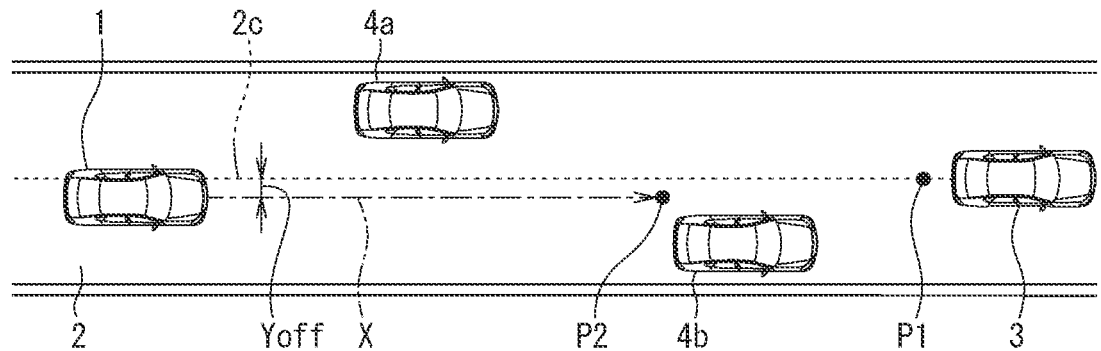
FIG. 2B is an explanatory diagram of an example of a vehicle control method of the embodiment.

FIG. 2B is an explanatory diagram of an example of a vehicle control method of the embodiment. In the vehicle control method of the embodiment, whether or not the vehicle speed of the own vehicle 1 is reduced to less than a predetermined speed threshold is determined. In addition, lateral deviation Yoff of the own vehicle 1 with respect to the lane center 2c is detected. Lateral deviation Yoff of the own vehicle 1 with respect to a lane boundary line of the lane 2 may be detected. When it is determined that the vehicle speed is reduced to less than the speed threshold, a target travel trajectory X of the own vehicle is generated in such a way as to suppress change in the lateral deviation Yoff at and after a vehicle speed reduction time point T1 that is a time point at which the vehicle speed is reduced to less than the speed threshold.

For example, the vehicle speed reduction time point T1 may be detected or estimated and the lateral deviation Yoff of the own vehicle 1 with respect to the lane center 2c or the lane boundary line at the vehicle speed reduction time point T1 may be detected. The target travel trajectory X of the own vehicle may be generated in such a way as to maintain the lateral deviation Yoff detected at the vehicle speed reduction time point T1.

When an avoidance target (in the example in FIG. 2B, the parked vehicle 4b) to be avoided by the own vehicle 1 is detected, the avoidance target is avoided by, after the vehicle speed reduction time point T1, adjusting deceleration of the own vehicle 1 while the own vehicle 1 travels along the target travel trajectory X.

Thus, in a period after the vehicle speed reduction time point T1, lateral movement to avoid an avoidance target (in the example in FIG. 2B, the parked vehicle 4b) is suppressed. Therefore, turning angle change to avoid an avoidance target while the speed of the own vehicle is low can be suppressed. As a result, rotation of the steering wheel can be suppressed.

In addition, when an avoidance target (for example, the parked vehicle 4a) was avoided at a time point before the vehicle speed reduction time point T1, the target travel trajectory X is set in such a way as to maintain the lateral deviation Yoff at the vehicle speed reduction time point T1. Since because of this configuration, a movement to return to a lateral position in the lane before avoidance behavior is eliminated, turning angle change while the speed of the own vehicle is low can be suppressed. As a result, rotation of the steering wheel can be suppressed.

Functions of the controller 16 will be described in detail below. FIG. 3 is a block diagram of an example of a functional configuration of the controller 16. The controller 16 includes an object detection unit 30, an own-vehicle position estimation unit 31, a map acquisition unit 32, a detection integration unit 33, an object tracking unit 34, a position-in-map calculation unit 35, and a vehicle control unit 36.

The object detection unit 30 detects, based on detection signals from the object sensors 11, positions, attitudes, sizes, speeds, and the like of objects around the own vehicle 1, such as a vehicle (a car or a motorcycle), a pedestrian, and an obstacle. The object detection unit 30 outputs detection results representing two-dimensional positions, attitudes, sizes, speeds, and the like of objects in, for example, a zenith view (also referred to as a plan view) in which the own vehicle 1 is viewed from the sky.

The own-vehicle position estimation unit 31 measures an absolute position of the own vehicle 1, that is, a position, an attitude, and speed of the own vehicle 1 with respect to a predetermined reference point, based on a measurement result by the positioning device 13 and odometry using detection results from the vehicle sensors 12. The map acquisition unit 32 acquires map information that indicates a structure of a road on which the own vehicle 1 travels, from the map database 14.

The detection integration unit 33 integrates a plurality of detection results that the object detection unit 30 has respectively acquired from a plurality of object detection sensors and outputs a single set of a two-dimensional position, an attitude, size, speed, and the like with respect to each object. Specifically, the detection integration unit 33 calculates, from behaviors of objects respectively acquired from the object detection sensors, the most reasonable behaviors of the objects that minimize error, in consideration of error characteristics of the respective object detection sensors. Specifically, by using a known sensor fusion technology, the detection integration unit 33 comprehensively evaluates detection results acquired by a plurality of types of sensors and acquires a more accurate detection result.

The object tracking unit 34 tracks objects detected by the object detection unit 30. Specifically, based on the detection results integrated by the detection integration unit 33, the object tracking unit 34 performs verification of identity (association) of objects between different times from behaviors of the objects output at different times and predicts, based on the association, behaviors of the objects, such as speed.

The position-in-map calculation unit 35 estimates a position and an attitude of the own vehicle 1 on the map from the absolute position of the own vehicle 1, which is acquired by the own-vehicle position estimation unit 31, and the map information, which is acquired by the map acquisition unit 32. In addition, the position-in-map calculation unit 35 identifies a road on which the own vehicle 1 is traveling, further identifies a lane 2 on which the own vehicle 1 travels and an adjacent lane 4 of the lane 2 within the identified road, and calculates a lateral direction position (a vehicle width direction position or a lateral position in the lane) of the own vehicle 1 in the lane 2.

The vehicle control unit 36 controls travel of the own vehicle 1 by driving the actuators 17, based on prediction results of behaviors of objects predicted by the object tracking unit 34, a calculation result of a position and attitude of the own vehicle 1 calculated by the position-in-map calculation unit 35, and an input by a passenger (for example, the driver). The vehicle control unit 36 includes a route setting unit 40, a path generation unit 41, a speed reduction time point determination unit 42, and a control command value calculation unit 43.

The route setting unit 40 sets a lane-based target route (hereinafter, simply referred to as "route") on which the own vehicle 1 is to travel, based on a current position of the own vehicle 1 calculated by the position-in-map calculation unit 35 and a destination input by the passenger (or based on a navigation route set by the navigation device 15). The route is a target route that is statically set and is set based on a lane shape in the high-definition map stored in the map database 14 and a shape of a lane boundary line detected by the object sensors 11. For example, the lane center of a road on which the own vehicle 1 travels when the own vehicle 1 moves from the current position to the destination may be set as the route.

The path generation unit 41 determines whether or not the own vehicle 1 performs a driving action, such as a lane change, and based on a determination result, sets a target path (hereinafter, simply referred to as "path") that the own vehicle 1 is to travel. The path is dynamically set according to driving action of the own vehicle 1, and when, for example, the own vehicle 1 is caused to make a lane change according to traffic conditions, the path generation unit 41 generates a movement route on which the own vehicle 1 moves from a lane before the lane change to a lane after the lane change, based on a vehicle model of the own vehicle 1. On the contrary, when the own vehicle 1 is not caused to make a lane change, the path generation unit 41 generates a path that coincides with the route. A path P that the path generation unit 41 generates may be point sequence data as expressed by the formula (1) below.

$$P = [P_L, P_{L+1}, \ldots, P_{L+M}] \tag{1}$$

Note that $P_{L+M}$ in the formula (1) is data of a point on the path M (m) ahead of the current position. The path P is information representing a shape of a path that the own vehicle 1 is to follow and does not have information about vehicle speed. Each point $P_{L+i}$ in the point sequence is represented by, for example, a position (x, y), an attitude (θ), and curvature (κ). The position (x, y) represents coordinates in a map coordinate system, and the attitude (θ) represents a travel direction (tangential direction) of the path at each point.

The speed reduction time point determination unit 42 detects or estimates a vehicle speed reduction time point T1 that is a time point at which the own vehicle 1 has started deceleration to a target stop position and current vehicle speed v of the own vehicle 1 is reduced to less than a predetermined speed threshold $V_{TH}$. First, the speed reduction time point determination unit 42 determines whether or not an object that serves as a stop target exists in front of the own vehicle 1. The stop targets include all objects before which the own vehicle 1 is to stop, such as a vehicle, a stop line, a pedestrian, and a crosswalk in front of the own vehicle 1 on the lane 2 on which the own vehicle 1 travels. When an object serving as a stop target exists in front of the own vehicle 1, the speed reduction time point determination unit 42 sets a target stop position to a position a predetermined distance short of the stop target.

Next, the speed reduction time point determination unit 42 determines whether or not the own vehicle has started deceleration to the target stop position. When, for example, the formula (2) below is satisfied, the speed reduction time point determination unit 42 may determine that the own vehicle has started deceleration to the target stop position.

$$L < v^2/(2a) \tag{2}$$

L, v, and a in the formula (2) denote distance from the current position of the own vehicle 1 to the target stop position, current vehicle speed of the own vehicle 1, and a predetermined deceleration (set value), respectively. When the distance from the current position to the target stop position is shorter than a distance that the own vehicle 1 travels before the own vehicle 1 decelerates at a constant deceleration a and stops, the speed reduction time point determination unit 42 determines that the own vehicle has started deceleration to the target stop position.

When the formula (2) above is established, the speed reduction time point determination unit 42 sets a deceleration start flag Fd to "True" and subsequently, without evaluating the formula (2), determines that the own vehicle 1 is decelerating to the target stop position, until the following deceleration start cancel condition (A) or (B) is established.

(A) After it is determined that the own vehicle has started deceleration, the own vehicle stops at the target stop position.

(B) After it is determined that the own vehicle has started deceleration, the target stop position is changed or canceled. Examples of the deceleration start cancel condition (B) include a case where a preceding vehicle serving as a stop target has moved forward. The examples also include a case where a traffic light at which a stop line serving as a stop target is disposed changing from a stop display (red signal) to a go display (green signal) has caused the target stop position to be canceled.

When the deceleration start cancel condition (A) or (B) is established, the speed reduction time point determination unit 42 cancels the determination determining that the own vehicle 1 has started deceleration to the target stop position and sets the deceleration start flag Fd to "False".

Next, the speed reduction time point determination unit 42 determines whether or not the own vehicle 1 almost stops. For example, when the current vehicle speed v of the own vehicle 1 falls below the predetermined speed threshold $V_{TH}$, the speed reduction time point determination unit 42 determines that the own vehicle 1 almost stops.

When after determining that the own vehicle 1 has started deceleration to the target stop position, the speed reduction time point determination unit 42 determines that the own vehicle 1 almost stops, the speed reduction time point determination unit 42 detects a speed reduction state of the own vehicle 1. The speed reduction time point determination unit 42 detects a time point at which a speed reduction state is first detected as the vehicle speed reduction time point T1.

Note that the speed reduction time point determination unit 42 may estimate a time at which the current vehicle speed v falls below the speed threshold $V_{TH}$, based on the current vehicle speed v and deceleration of the own vehicle 1 and estimate a time at which after it is determined that the own vehicle 1 has started deceleration to the target stop position, the vehicle speed v falls below the speed threshold $V_{TH}$ as the vehicle speed reduction time point T1.

That is, the "speed reduction state" is a state in which the own vehicle 1 has started deceleration to the target stop position and the vehicle speed v is less than the speed threshold $V_{TH}$. The "vehicle speed reduction time point T1" is a time point at which after the own vehicle 1 has started deceleration to the target stop position, the vehicle speed v is reduced to less than the speed threshold $V_{TH}$.

The speed reduction time point determination unit 42 records deviation in the lane width direction of the own vehicle 1 with respect to the path P at the vehicle speed reduction time point T1 as lateral deviation Yoff. When the path P is generated along the lane center, the lateral deviation Yoff is lateral deviation of the own vehicle 1 with respect to the lane center. In place of the lane center, lateral deviation with respect to a lane boundary line may be recorded. The speed reduction time point determination unit 42 sets a recording completion flag Fr indicating that the lateral deviation Yoff has been recorded to "True". The speed reduction time point determination unit 42 is capable of determining whether or not the speed reduction time point determination unit 42 has first detected a speed reduction state, based on whether the recording completion flag Fr is "False" or "True".

On the other hand, when the speed reduction time point determination unit 42 does not determine that the own vehicle 1 has started deceleration or does not determine that the own vehicle 1 almost stops, the speed reduction time point determination unit 42 does not detect a speed reduction state of the own vehicle 1. On this occasion, the recording completion flag Fr is set to "False".

Next, the control command value calculation unit 43 calculates a control command value that causes the own vehicle 1 to move along the path P generated by the path generation unit 41 while keeping a space to objects around the own vehicle 1. The control command value calculation unit 43 calculates a speed command value of the own vehicle 1, based on distance to a target stop position, relative speed with respect to a stop target, and relative acceleration. The command value calculation unit 43 calculates a target travel trajectory X of the own vehicle 1 by calculating a target position, an attitude, speed, and curvature of the own vehicle at each time t+i×dt (i is an integer of 1 to N) for N steps from the current time t to t+N×dt seconds later, based on the speed command value and the path P.

The target travel trajectory X is a point sequence on a trajectory that represents future states of the own vehicle 1 for a certain period of time and is, for example, represented by a point sequence expressed by the formula (3) below.

$$X=[X_t, X_{t+dt}, X_{t+2dt}, \ldots, X_{t+N \times dt}] \quad (3)$$

$X_{t+T}$ denotes a target state of the own vehicle T seconds later and is represented by a position (x, y), an attitude (θ), speed (v), and curvature (κ).

In addition, the control command value calculation unit 43 calculates a predicted trajectory Xp of the own vehicle 1. The predicted trajectory Xp is a trajectory obtained by predicting future states of the vehicle and becomes a trajectory that with the current position of the own vehicle 1 as a start point, while avoiding an obstacle, comes as close as possible to the target trajectory. Components of each point on the predicted trajectory Xp are the same as components of each point of the target travel trajectory X.

An example of a calculation method of the target travel trajectory X by the control command value calculation unit 43 will be described below. The control command value calculation unit 43, by repeating processing of calculating a point $X_{t+T}$ on a target trajectory at a time t+T, based on a point $X_{t+T-dt}$ one step earlier for N steps, calculates a point sequence of X [$X_t$, $X_{t+dt}$, $X_{t+2dt}$, . . . , $X_{t+N \times dt}$]. Specifically, the control command value calculation unit 43 calculates a position to which the own vehicle 1 advances along the path P from the point $X_{t+T-dt}$ one step earlier by a displacement D and an attitude at the position as the point $X_{t+T}$.

The displacement D is calculated by the formula (4) below:

$$D=V_{t+T-dt} \times dt \quad (4)$$

where $v_{t+T-dt}$ is speed at the point $X_{t+T-dt}$ one step earlier on the target trajectory, and dt is a step time duration.

The control command value calculation unit 43 calculates a speed command value from distance from the point $X_{t+T}$ on the target trajectory to the target stop position.

For example, the control command value calculation unit 43 may calculate a speed command value V that minimizes an evaluation function F expressed by the formula (5) below by optimization calculation.

[Math 1]
$$F = \sum_i \left[ W_L * \{\max(0, Lr_i - L_i - (V_i - V) \cdot dt)\}^2 \right] + W_v * (Vr - V)^2 \quad (5)$$

In the formula (5), $Lr_i$ denotes distance to a target stop position for a stop target i, $L_i$ denotes current distance between the stop target i and the own vehicle 1, $V_i$ denotes speed of the stop target i, Vr denotes set vehicle speed, $W_L$ denotes weight of inter-vehicle distance, and $W_V$ denotes weight of the set vehicle speed.

When the speed reduction time point determination unit 42 detects a speed reduction state of the own vehicle 1 (that is, when the speed reduction time point determination unit 42, after determining that the own vehicle 1 has started deceleration to the target stop position, determines that the own vehicle 1 almost stops), the control command value calculation unit 43 corrects the point $X_{t+T}$ on the target travel trajectory X as in the formula (6) below, based on the lateral deviation Yoff at a vehicle speed reduction time point T1.

[Math 2]
$$Xc_{t+T} = X_{t+T} + Y_{off} \cdot \begin{pmatrix} -\sin(\theta) \\ \cos(\theta) \end{pmatrix} \quad (6)$$

$Xc_{t+T}$ and $\theta$ in the formula (6) denote the point $X_{t+T}$ after correction and an attitude (a travel direction or a tangential direction) of the target travel trajectory X at the point $X_{t+T}$, respectively. That is, the control command value calculation unit 43 corrects the point $X_{t+T}$ on the target travel trajectory X by moving a lane width direction position of the point $X_{t+T}$ on the target travel trajectory X according to the lateral deviation Yoff.

Figure 4A:
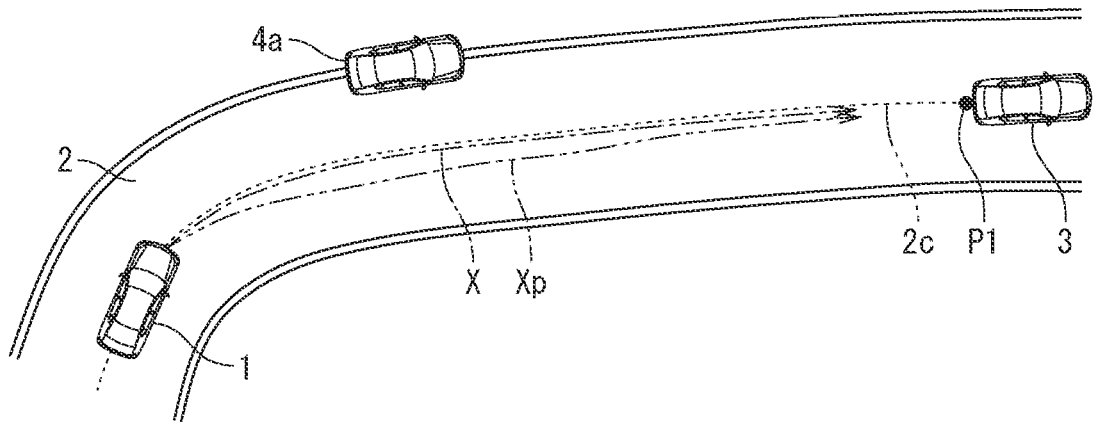
FIG. 4A is an explanatory diagram of an example of a target travel trajectory when an own vehicle is not in a speed reduction state.
Figure 4B:
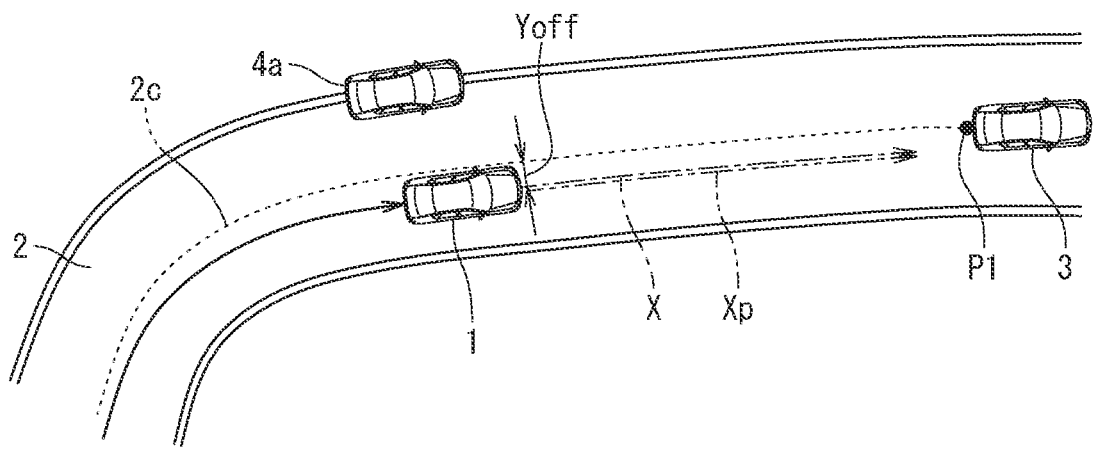
FIG. 4B is an explanatory diagram of an example of the target travel trajectory in the speed reduction state.

Effect of the correction is illustrated in FIGS. 4A and 4B. FIG. 4A is an explanatory diagram of an example of a target travel trajectory when the own vehicle 1 is not in the speed reduction state. In this case, target trajectory points X are generated in such a manner as to completely follow the path P. In the example in FIG. 4A, the target trajectory points X are generated along the lane center 2c. The predicted trajectory Xp is generated in such a manner as to, after avoiding the parked vehicle 4a on the left-hand side, return to the lane center 2c.

When the own vehicle 1 performs a turning movement along the predicted trajectory Xp while traveling at an extremely low speed immediately before the target stop position P1, there is a possibility that the steering wheel largely moves and the passenger is given a sense of discomfort, as described above.

FIG. 4B is now referred to. When the own vehicle 1 has come close to the target stop position P1 and a speed reduction state of the own vehicle 1 is detected, the target travel trajectory X is corrected in such a manner as to maintain the lateral deviation Yoff. Since because of this configuration, the own vehicle 1 stops without eliminating the lateral deviation Yoff at the time of having avoided the parked vehicle 4a, movement of the steering wheel can be suppressed.

FIG. 3 is now referred to. The control command value calculation unit 43 performs vehicle control of the own vehicle 1, using the generated target travel trajectory X. In the vehicle control, for example, steering and vehicle speed of the own vehicle 1 are controlled.

In the vehicle control, control input (an acceleration/deceleration command value $dV_{in}$ and a steering command value $dK_{in}$) to be input to the own vehicle 1 is calculated in such a way that the predicted trajectory Xp of the own vehicle 1 for N×dt seconds comes close to the target travel trajectory X while keeping distance to an avoidance target around the own vehicle. The control can be achieved using general model predictive control.

For example, the control command value calculation unit 43 calculates a control input U at a time t+T in such a way that when the control input U is input to the own vehicle 1 at a discrete time t+T, an evaluation function defined according to a difference between a point $Xp_{t+T}$ on the predicted trajectory Xp and a point $X_{t+T}$ on the target travel trajectory of the own vehicle 1 and a degree of proximity of the own vehicle 1 to an avoidance target decreases.

When no speed reduction state of the own vehicle 1 is detected, an evaluation function $J_1$ at each time t+T is defined as, for example, the formula (7) below.

[Math 3]
$$J_1 = \sum_i [W_c * A_{i,t+T}] + Xe^T \cdot W_X \cdot Xe + U^T \cdot W_U \cdot U \quad (7)$$

In the formula (7), $W_O$, $W_X$, and $W_U$ are weighting matrices, and Xe is $(X_{t+T} - Xp_{t+T})$. $A_{i,\ t+T}$ is a variable representing a degree of proximity of the own vehicle 1 to an avoidance target i. $A_{i,\ t+T}$ may be, for example, area of a region where an avoidance target region surrounding the avoidance target i and the own vehicle 1 overlap each other or a variable depending on distance between the avoidance target i and the own vehicle 1.

The first term of the evaluation function $J_1$ increases when a predicted position $Xp_{t+T}$ of the own vehicle 1 is coming close to the avoidance target i. $A_{i,\ t+T}$ is a function of a state quantity $Xp_{t+T}$, and the state quantity $Xp_{t+T}$ is a function of a current state quantity $Xp_t$ and the control input U. By optimization calculation, a control input U that minimizes $A_{i,\ t+T}$ is calculated.

In addition, the second term of $J_1$ is a cost associated with a difference between a predicted state $Xp_{t+T}$ and the target travel trajectory $X_{t+T}$ of the own vehicle 1. The third term is a cost associated with the absolute value of U. By using an evaluation function obtained by summing all of the terms, a control input that enables all of avoidance of an avoidance target (the first term), following of the target trajectory (the second term), and stabilization of the control input (the third term) to be achieved at the same time is calculated.

Figure 4C:
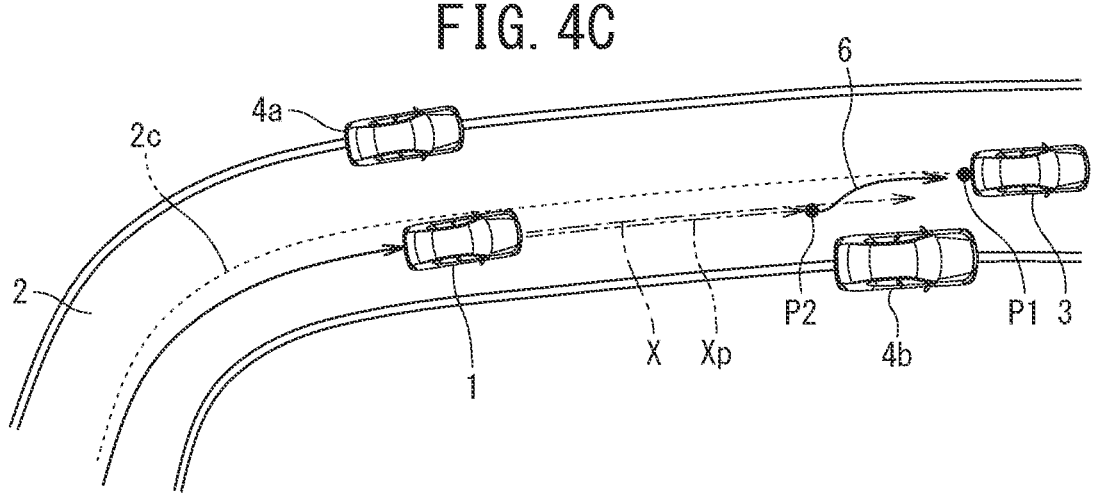
FIG. 4C is an explanatory diagram of an example of object avoidance control in the speed reduction state.

When the own vehicle 1 comes close to an avoidance target (the parked vehicle 4b) on a lateral side as illustrated in FIG. 4C, $A_{i,\ t+T}$ with respect to the avoidance target increases. Since in order to reduce $A_{i,\ t+T}$, the predicted position $Xp_{t+T}$ is required to be shifted to the leftward direction as illustrated by a reference sign 6, the steering command value $dK_{in}$ increases. On this occasion, when the own vehicle 1 travels at an extremely low speed immediately before the target stop position P1, the own vehicle 1 is required to be largely steered to move leftward. Therefore, the steering command value $dK_{in}$ becomes a large value, and there is a risk that the passenger is given a sense of discomfort.

Thus, in the present invention, when the own vehicle 1 comes close to the target stop position P1 and a speed reduction state of the own vehicle 1 is detected, a control input U that minimizes an evaluation function $J_2$ expressed by the formula (8) below is calculated by optimization calculation.

[Math 4]
$$J_2 = \sum_i \left[ W_o * A'_{i,t+T} * (v_i - v_{t+T})^2 \right] + Xe^T \cdot W_X \cdot Xe + U^T \cdot W_U \cdot U \quad (8)$$

In the formula (8), $v_i$ and $V_{t+T}$ are speeds of the avoidance target i and the own vehicle 1, respectively.

In addition, $A'_{i,\,t+T}$ is a definite value of the degree of proximity of the own vehicle 1 to the avoidance target i that was calculated when a control input U was calculated in a period before the time t+T (that is, a degree of proximity when a control input U at a time earlier than the time t+T is input to the own vehicle 1). Thus, $A'_{i,\,t+T}$ does not change by the control input U. That is, a partial derivative of $A'_{i,\,t+T}$ with respect to U becomes 0.

Therefore, an adjustment to decrease $A'_{i,\,t+T}$ to 0 by optimization calculation is not performed. On the other hand, since the degree of proximity $A'_{i,\,t+T}$ is multiplied by relative speed $(v_i - V_{t+T})$, adjustment to adjust the vehicle speed to the speed of the avoidance target i is performed when the own vehicle 1 is coming close to the avoidance target i. As a result, an acceleration/deceleration command value $dV_{in}$ that causes the own vehicle 1 to stop at a position P2 immediately before the avoidance target 4b on the right-hand side as illustrated in FIG. 4C is calculated.

The control command value calculation unit 43 calculate a control input U that minimizes the evaluation functions $J_1$ and $J_2$. The control command value calculation unit 43 drives the actuators 17, based on the calculated control input U and thereby controls the speed and steering angle of the own vehicle 1.

(Operation)

Figure 5:
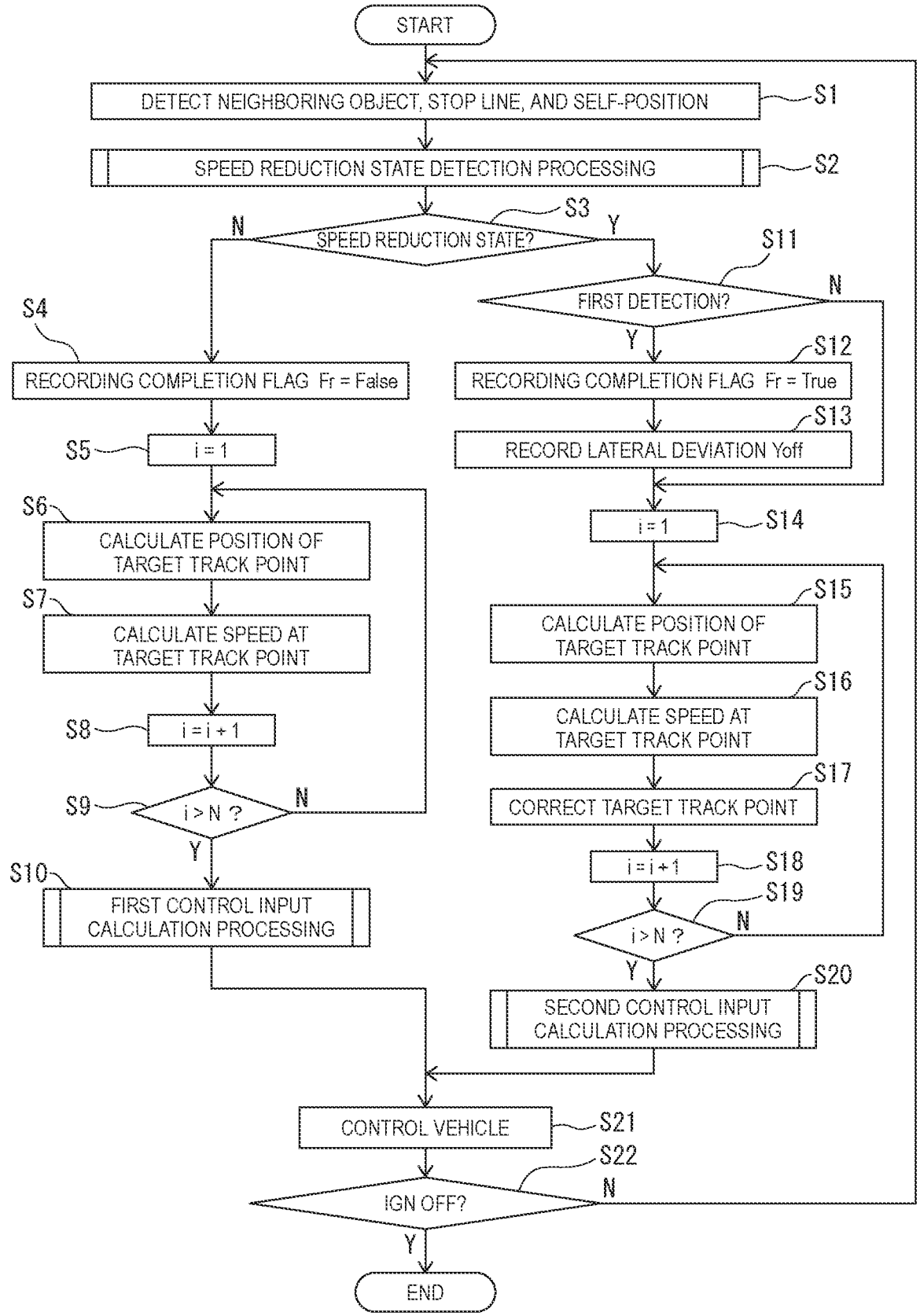
FIG. 5 is a flowchart of an example of the vehicle control method of the embodiment.

FIG. 5 is a flowchart of an example of a vehicle control method of the embodiment.

In step S1, the controller 16 detects an object and a stop line around the own vehicle 1 and a self-position of the own vehicle 1. In step S2, the speed reduction time point determination unit 42 performs speed reduction state detection processing.

Figure 6:
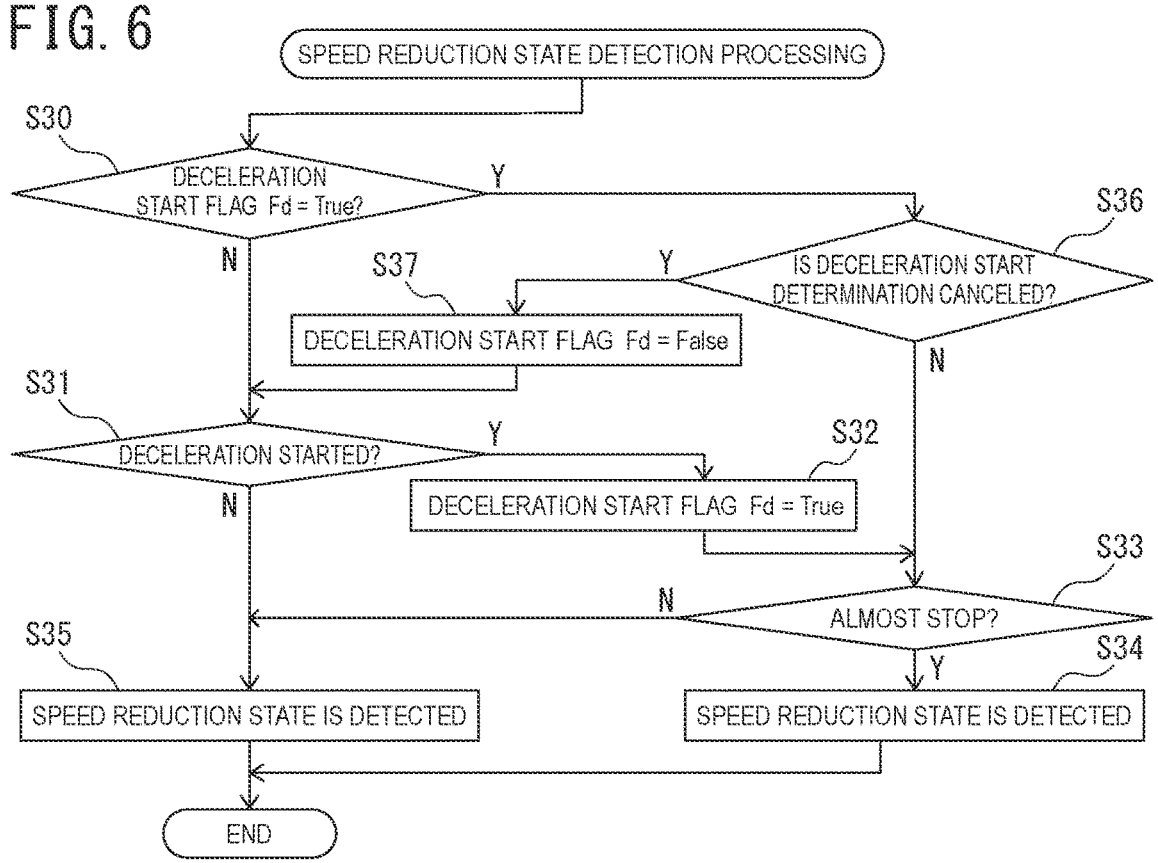
FIG. 6 is a flowchart of a first example of speed reduction state detection processing.

FIG. 6 is a flowchart of a first example of the speed reduction state detection processing. In step S30, the speed reduction time point determination unit 42 determines whether or not the deceleration start flag Fd is "True". When the deceleration start flag Fd is not "True" (step S30: N), the process proceeds to step S31. When the deceleration start flag Fd is "True" (step S30: Y), the process proceeds to step S36.

In step S36, the speed reduction time point determination unit 42 determines whether or not a deceleration start cancel condition is established. When the deceleration start cancel condition is not established (S36: N), the process proceeds to step S33. When the deceleration start cancel condition is established (S36: Y), the process proceeds to step S37.

In step S37, the speed reduction time point determination unit 42 sets the deceleration start flag Fd to "False". Subsequently, the process proceeds to step S31.

In step S31, the speed reduction time point determination unit 42 determines whether or not the own vehicle has started deceleration to a target stop position. When the own vehicle has started deceleration (S31: Y), the process proceeds to step S32. When the own vehicle has not started deceleration (S31: N), the process proceeds to step S35. In step S35, the speed reduction time point determination unit 42 determines that no speed reduction state of the own vehicle 1 has been detected. Subsequently, the speed reduction state detection processing terminates.

In step S32, the speed reduction time point determination unit 42 sets the deceleration start flag Fd to "True". Subsequently, the process proceeds to step S33.

In step S33, the speed reduction time point determination unit 42 determines whether or not the own vehicle 1 almost stops. When the own vehicle 1 does not almost stop (S33: N), the process proceeds to step S35 where the speed reduction time point determination unit 42 determines that no speed reduction state of the own vehicle 1 has been detected, and the speed reduction state detection processing terminates.

When the own vehicle 1 almost stops (S33: Y), the process proceeds to step S34. The speed reduction time point determination unit 42 determines that a speed reduction state of the own vehicle 1 is detected. Subsequently, the speed reduction state detection processing terminates.

FIG. 5 is now referred to. When speed reduction state is detected (S3: Y), the process proceeds to step S11. When no speed reduction state has been detected (S3: N), the process proceeds to step S4. The speed reduction time point determination unit 42 sets the recording completion flag Fr to "False".

In step S5, the control command value calculation unit 43 initializes a variable i to "1". In step S6, the control command value calculation unit 43 calculates a position of a point $X_{t+i \times dt}$ on a target travel trajectory X at a time t+i×dt. In step S7, the control command value calculation unit 43 calculates a speed command value at the point $X_{t+i \times dt}$ on the target travel trajectory X. In step S8, the control command value calculation unit 43 increments a value of the variable i by 1. In step S9, the control command value calculation unit 43 determines whether or not the variable i is greater than N. When the variable i is not greater than N (S9: N), the process returns to step S6. When the variable i is greater than N (S9: Y), the process proceeds to step S10.

In step S10, the control command value calculation unit 43 calculates a control input U by optimization calculation that minimizes the evaluation functions $J_1$ expressed by the formula (7) above. Subsequently, the process proceeds to step S21.

On the other hand, in step S11, the speed reduction time point determination unit 42 determines whether or not the speed reduction state is first detected (that is, whether or not the recording completion flag Fr is "False"). When the speed reduction state is first detected (S11: Y), the process proceeds to step S12. When a speed reduction state has already been detected (S11: N), the process proceeds to step S14.

In step S12, the speed reduction time point determination unit 42 sets the recording completion flag Fr to "True". In step S13, the speed reduction time point determination unit 42 records lateral deviation Yoff. Processing in steps S14 to S16 are the same as the processing in steps S5 to S7.

In step S17, the control command value calculation unit 43 corrects a point $X_{i+T}$ on the target travel trajectory X, based on the lateral deviation Yoff.

In step S18, the control command value calculation unit 43 increments the value of the variable i by 1. In step S19, the control command value calculation unit 43 determines whether or not the variable i is greater than N. When the variable i is not greater than N (S19: N), the process returns to step S15. When the variable i is greater than N (S19: Y), the process proceeds to step S20. In step S20, the control command value calculation unit 43 calculates a control input U by optimization calculation that minimizes the evaluation functions $J_2$ expressed by the formula (8) above. Subsequently, the process proceeds to step S21.

In step S21, the control command value calculation unit 43 controls the own vehicle 1, based on the control input U. In step S22, whether or not an ignition key has been turned off is determined. When the ignition key has not been turned off (S22: N), the process returns to step S1. When the ignition key is turned off (S22: Y), the process terminates.

(Variations)

Figure 7:
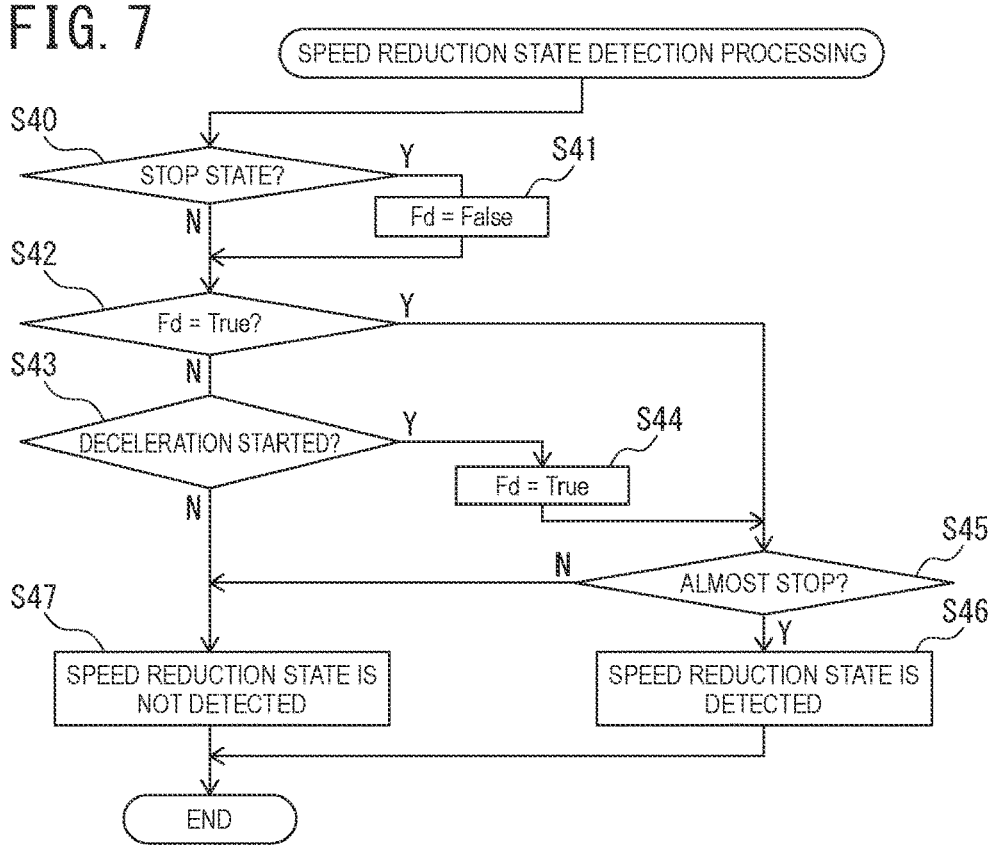
FIG. 7 is a flowchart of a second example of the speed reduction state detection processing.

(1) In the above-described embodiment, when one of the deceleration start cancel conditions (A) "the own vehicle stops at the target stop position" and (B) "the target stop position is changed or canceled" is established, the speed reduction time point determination unit 42 cancels the determination determining that the own vehicle 1 has started deceleration to the target stop position. Instead of this configuration, the determination of establishment of the deceleration start cancel condition (B) may be omitted as in a flowchart illustrated in FIG. 7.

In step S40, the speed reduction time point determination unit 42 determines whether or not the own vehicle 1 is in a stop state. When the own vehicle 1 is in the stop state (S40: Y), the process proceeds to step S41. When the own vehicle 1 is not in the stop state (S40: N), the process proceeds to step S42. In step S41, the speed reduction time point determination unit 42 sets the deceleration start flag Fd to "False".

In step S42, the speed reduction time point determination unit 42 determines whether or not the deceleration start flag Fd is "True". When the deceleration start flag Fd is "True" (S42: Y), the process proceeds to step S45. When the deceleration start flag Fd is not "True" (S42: N), the process proceeds to step S43. Processing in steps S43 to S47 are the same as the processing in steps S31 to S35 in FIG. 6.

(2) The determination of establishment of the above-described deceleration start cancel conditions (A) and (B) is determination to detect that "deceleration to stop has become unnecessary" and may be substituted by determination of whether or not the formula (9) below is satisfied:

$$L>v^2/(2a)+L_{TH} \quad (9)$$

where $L_{TH}$ is a determination margin.

That is, when a situation has changed after it is determined that the own vehicle 1 has started deceleration to the target stop position and a margin to the target stop position has become $L_{TH}$ or more, the determination determining that the own vehicle 1 has started deceleration to the target stop position may be canceled.

Figure 8:
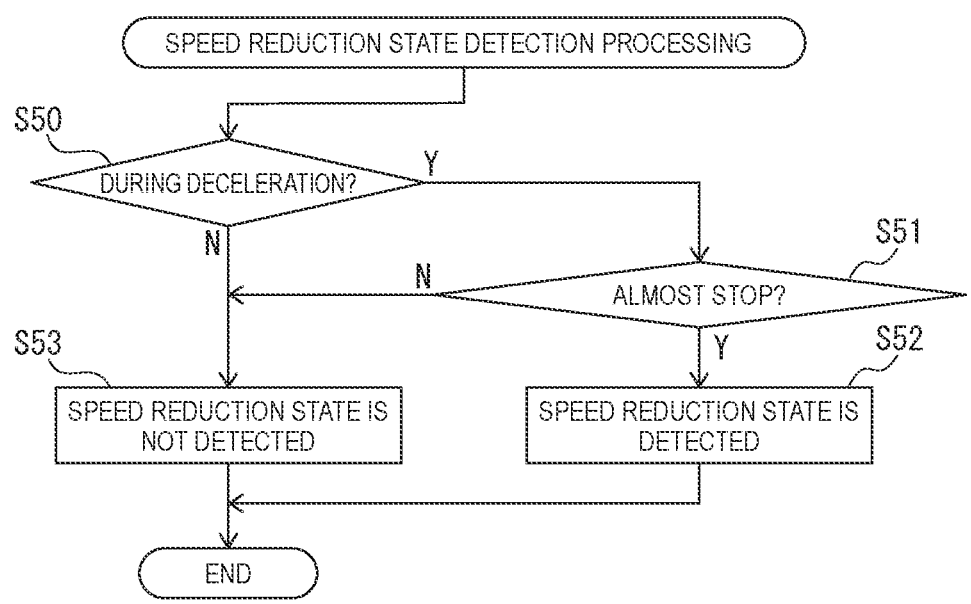
FIG. 8 is a flowchart of a third example of the speed reduction state detection processing.

(3) Further, a speed reduction state of the own vehicle 1 may be detected by combining the condition expressed by the formula (9) above and the condition expressed by the formula (1) above. FIG. 8 is a flowchart of a third example of the speed reduction state detection processing.

In step S50, the speed reduction time point determination unit 42 determines whether or not the own vehicle 1 is decelerating. The speed reduction time point determination unit 42 determines that the own vehicle 1 is decelerating when the formula (10) below is established.

$$L<v^2/(2a)+L_{TH} \quad (10)$$

When the own vehicle 1 is decelerating (S50: Y), the process proceeds to step S51. When the own vehicle is not decelerating (S50: N), the process proceeds to step S53.

In step S51, the speed reduction time point determination unit 42 determines whether or not the own vehicle 1 almost stops. When the own vehicle 1 almost stops (S51: Y), the process proceeds to step S52. When the own vehicle 1 does not almost stop (S51: N), the process proceeds to step S53. In step S52, the speed reduction time point determination unit 42 determines that a speed reduction state of the own vehicle 1 is detected. In step S53, the speed reduction time point determination unit 42 determines that no speed reduction state of the own vehicle 1 has been detected. Although in the determination in step S50 in FIG. 8, the determination condition of whether or not the own vehicle 1 is decelerating is relaxed by an amount equivalent to the margin LITHI, a combination of the determination of whether or not the own vehicle 1 is decelerating and the determination of whether or not the own vehicle 1 almost stops in step S51 enables a determination condition similar to that in the above-described embodiment to be achieved.

(4) Further, considering that a threshold to determine whether or not the own vehicle 1 almost stops is the vehicle speed $V_{TH}$, whether or not the own vehicle 1 is decelerating may be determined depending on whether or not a conditional expression $L<V_{TH}^2/(2a)+L_{TH}$ is satisfied in step S50 in FIG. 8. In this case, since the vehicle speed v of the own vehicle being the threshold $V_{TH}$ or less is indirectly taken into consideration, step S51 to determine whether or not the own vehicle almost stops may be omitted.

(Advantageous Effects of Embodiment)

(1) The controller 16 executes vehicle speed determination processing of determining whether or not vehicle speed of an own vehicle is reduced to less than a predetermined speed threshold, lateral deviation detection processing of detecting lateral deviation of the own vehicle with respect to a lane center or a lane boundary line, target trajectory generation processing of, when determining that the vehicle speed is reduced to less than the speed threshold, generating a first target travel trajectory of the own vehicle in such a way as to suppress change in the lateral deviation at and after a vehicle speed reduction time point, the vehicle speed reduction time point being a time point at which the vehicle speed is reduced to less than the speed threshold, avoidance target detection processing of detecting an avoidance target to be avoided by the own vehicle, and avoidance processing of avoiding the avoidance target by, after the vehicle speed reduction time point, adjusting deceleration of the own vehicle while the own vehicle travels along the first target travel trajectory.

Because of this configuration, turning angle change that is generated in association with avoidance of an object can be suppressed when the speed of the own vehicle is low. Because of this capability, it is possible to prevent the steering wheel from largely moving and a passenger from thereby being given a sense of discomfort.

(2) The controller 16 may execute processing of setting a target stop position in front of the own vehicle and processing of determining whether or not the own vehicle has started deceleration to the target stop position, and execute the target trajectory generation processing and the avoidance processing when determining that the own vehicle has started deceleration to the target stop position and determining that the vehicle speed is reduced to less than the speed threshold. Because of this configuration, turning angle change can be suppressed only when the own vehicle stops at the target stop position.

(3) The controller 16 executes neither the target trajectory generation processing nor the avoidance processing when after determining that the own vehicle has started deceleration to the target stop position, the own vehicle stops at the target stop position or the target stop position is changed or canceled. Because of this configuration, it is possible to prevent turning angle change from being unnecessarily suppressed.

(4) The controller 16 may execute processing of calculating a required distance in which the own vehicle is able to stop at the target stop position with a predetermined deceleration according to current vehicle speed of the own vehicle, determine that the own vehicle has started deceleration to the target stop position when distance from the own vehicle to the target stop position is less than a distance threshold set according to the required distance, and execute the target trajectory generation processing and the avoidance processing when determining that the own vehicle has started deceleration to the target stop position and determining that the vehicle speed is reduced to less than the speed threshold. Because of this configuration, it is possible to determine whether or not the own vehicle is decelerating to the target stop position.

(5) The controller may generate a second target travel trajectory, based on a lane shape and generate the first target travel trajectory by moving a lane width direction position of the second target travel trajectory according to the lateral deviation detected at the vehicle speed reduction time point. Because of this configuration, a target travel trajectory that maintains lateral deviation can be calculated.

(6) The controller may execute processing of calculating a control input in such a manner as to reduce an evaluation function according to a difference between a predicted position of the own vehicle when the control input including acceleration/deceleration and a steering angle is input to the own vehicle and the first target travel trajectory and a degree of proximity of the own vehicle to the avoidance target, and the evaluation function evaluated when the control input is calculated at a first time may include a term obtained by multiplying the degree of proximity when the control input calculated at a second time, the second time being earlier than the first time, is input to the own vehicle by relative speed of the avoidance target with respect to the own vehicle. Because of this configuration, an avoidance target can be avoided by adjustment of deceleration.

REFERENCE SIGNS LIST

1 Own vehicle
2 Lane
2c Lane center
3 Preceding vehicle
4a, 4b Parked vehicle
P1 Target stop position
X Target travel trajectory
Xp Predicted trajectory
Yoff Lateral deviation

The invention claimed is:

1. A vehicle control method causing a controller to execute:
vehicle speed determination processing of determining whether or not vehicle speed of an own vehicle is reduced to less than a predetermined speed threshold;
lateral deviation detection processing of detecting lateral deviation of the own vehicle with respect to a lane center or a lane boundary line;
target trajectory generation processing of, when determining that the vehicle speed is reduced to less than the speed threshold, generating a first target travel trajectory of the own vehicle in such a way as to suppress change in the lateral deviation at and after a vehicle speed reduction time point, wherein the vehicle speed reduction time point is a time point at which the vehicle speed is reduced to less than the speed threshold;
avoidance target detection processing of detecting an avoidance target to be avoided by the own vehicle; and
avoidance processing of avoiding the avoidance target by, after the vehicle speed reduction time point, adjusting deceleration of the own vehicle while the own vehicle travels along the first target travel trajectory.

2. The vehicle control method according to claim 1, wherein
the controller executes:
processing of setting a target stop position in front of the own vehicle; and
processing of determining whether or not the own vehicle has started deceleration to the target stop position, and
executes the target trajectory generation processing and the avoidance processing when determining that the own vehicle has started deceleration to the target stop position and determining that the vehicle speed is reduced to less than the speed threshold.

3. The vehicle control method according to claim 2, wherein the controller executes neither the target trajectory generation processing nor the avoidance processing when after determining that the own vehicle has started deceleration to the target stop position, the own vehicle stops at the target stop position or the target stop position is changed or canceled.

4. The vehicle control method according to claim 2 or 3, wherein
the controller
executes processing of calculating a required distance in which the own vehicle is able to stop at the target stop position with a predetermined deceleration according to current vehicle speed of the own vehicle,
determines that the own vehicle has started deceleration to the target stop position when distance from the own vehicle to the target stop position is less than a distance threshold set according to the required distance, and
executes the target trajectory generation processing and the avoidance processing when determining that the own vehicle has started deceleration to the target stop position and determining that the vehicle speed is reduced to less than the speed threshold.

5. The vehicle control method according to any one of claims 1 to 4, wherein the controller generates a second target travel trajectory, based on a lane shape and generates the first target travel trajectory by moving a lane width direction position of the second target travel trajectory according to the lateral deviation detected at the vehicle speed reduction time point.

6. The vehicle control method according to any one of claims 1 to 5, wherein
the controller executes processing of calculating a control input in such a manner as to reduce an evaluation function according to a difference between a predicted position of the own vehicle when the control input including acceleration/deceleration and a steering angle is input to the own vehicle and the first target travel trajectory and a degree of proximity of the own vehicle to the avoidance target, and
the evaluation function evaluated when the control input is calculated at a first time includes a term obtained by multiplying the degree of proximity when the control input calculated at a second time, the second time being earlier than the first time, is input to the own vehicle by relative speed of the avoidance target with respect to the own vehicle.

7. A vehicle control device comprising a controller configured to execute:
vehicle speed determination processing of determining whether or not vehicle speed of an own vehicle is reduced to less than a predetermined speed threshold;
lateral deviation detection processing of detecting lateral deviation of the own vehicle with respect to a lane center or a lane boundary line;
target trajectory generation processing of, when determining that the vehicle speed is reduced to less than the speed threshold, generating a first target travel trajectory of the own vehicle in such a way as to suppress change in the lateral deviation at and after a vehicle speed reduction time point, wherein the vehicle speed reduction time point is a time point at which the vehicle speed is reduced to less than the speed threshold;
avoidance target detection processing of detecting an avoidance target to be avoided by the own vehicle; and
avoidance processing of avoiding the avoidance target by, after the vehicle speed reduction time point, adjusting deceleration of the own vehicle while the own vehicle travels along the first target travel trajectory.

* * * * *